United States Patent [19]
Nitschke et al.

[11] Patent Number: 6,128,876
[45] Date of Patent: Oct. 10, 2000

[54] TILE PANEL SYSTEM

[75] Inventors: John A. Nitschke, O'Halloran Hill; Bruce C. Newman, Leichhardt; Allan G. Cooper, Leichhardt; David C. Newman, Leichhardt; Rene A. Deillerk, Leichhardt; Phillip L. Peach, Church Point, all of Australia

[73] Assignee: Systems Supply PTY, Limited, Leichhardt, Australia

[21] Appl. No.: 09/077,422

[22] PCT Filed: Nov. 28, 1996

[86] PCT No.: PCT/AU96/00758

§ 371 Date: Jul. 14, 1998

§ 102(e) Date: Jul. 14, 1998

[87] PCT Pub. No.: WO97/19618

PCT Pub. Date: Jun. 5, 1997

[30] Foreign Application Priority Data

Nov. 28, 1995 [AU] Australia ............................... PN 6835
May 6, 1996 [AU] Australia ............................... PN 9693
Jun. 4, 1996 [AU] Australia ............................... PO 0248

[51] Int. Cl.[7] ....................................................... E04C 2/34
[52] U.S. Cl. ........................... 52/239; 52/220.7; 52/656.9; 403/174; 403/218; 403/381
[58] Field of Search .................................. 52/36.1, 220.7, 52/239, 656.9; 403/49, 170, 174, 217, 218, 334, 381

[56] References Cited

U.S. PATENT DOCUMENTS

| | | | |
|---|---|---|---|
| 3,828,516 | 8/1974 | Kern | ..................... 52/656.9 X |
| 3,834,549 | 9/1974 | Burg et al. | ........................... 403/218 X |
| 3,842,555 | 10/1974 | Korell . | |
| 5,219,406 | 6/1993 | Raz | ........................ 52/239 X |
| 5,244,300 | 9/1993 | Perreira et al. | ........................... 403/381 |
| 5,715,633 | 2/1998 | Raz et al. | ............................... 52/220.7 |

FOREIGN PATENT DOCUMENTS

| | | |
|---|---|---|
| 8253287 | 12/1987 | Australia . |
| 3403693 | 3/1993 | Australia . |
| 5241193 | 12/1993 | Australia . |
| 3203804 | 8/1983 | Germany . |
| 5-79106 | 3/1993 | Japan . |
| 5-280146 | 10/1993 | Japan . |
| 8-135057 | 5/1996 | Japan . |
| 1378154 | 11/1971 | United Kingdom .............. E04B 2/82 |
| WO 9300490 | 1/1993 | WIPO . |
| WO 9317192 | 9/1993 | WIPO . |
| WO 9532343 | 11/1995 | WIPO . |

*Primary Examiner*—Carl D. Friedman
*Assistant Examiner*—Kevin D. Wilkens
*Attorney, Agent, or Firm*—Daniel G. Chapik; Oppenheimer Wolff & Donnelly LLP

[57] ABSTRACT

A tile panel system has a frame for supporting one or more tiles. The system includes a plurality of vertical support member. Attached to the support members are two piece blocks that clamp around the vertical supports. Horizontal rails then extend between oppositely positioned clamp. Tiles are then releasably secured to the horizontal rails via spring clips or other appropriate mechanisms.

12 Claims, 7 Drawing Sheets

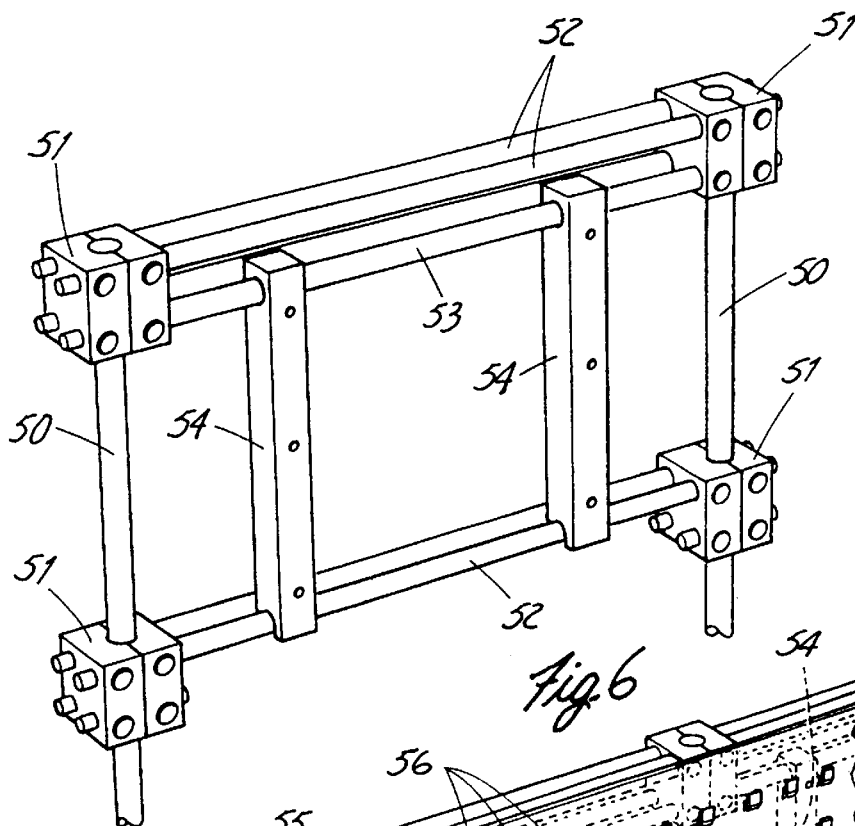
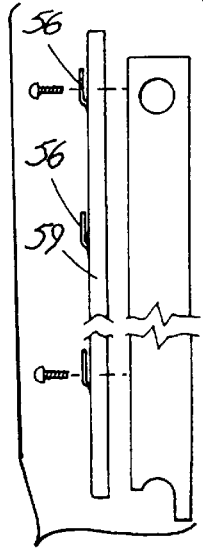
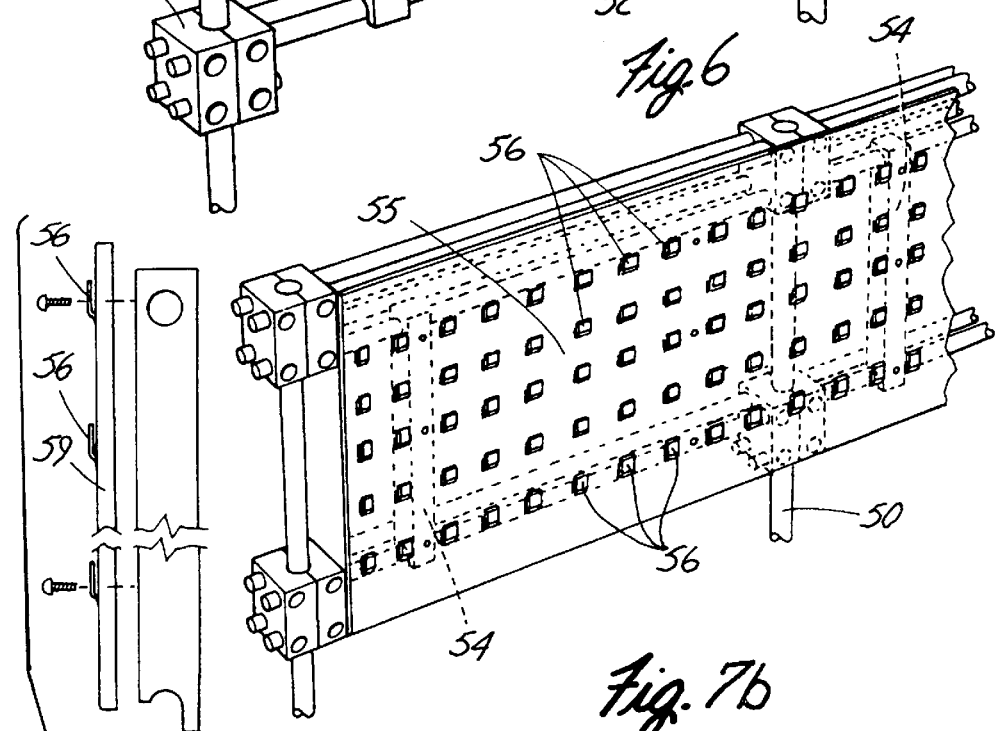
Fig. 6
Fig. 7a
Fig. 7b

TILE PANEL SYSTEM

TECHNICAL FIELD

This invention relates to a panel system for offices, work stations, partitions, division walls and the like.

BACKGROUND ART

The open space concept for work areas provides adaptability and versatility in layout by the use of adjustable and movable panels to divide the open space into individual work areas. These panels have usually been of modular construction usually of standard dimensions, each panel being covered with a suitable surface material which conforms to the decor of the area and which acoustically insulates to some degree. These panels usually comprise an external frame work supporting the surface material, there being clips or other coupling devices for connecting adjacent panels together. When the partition or screen is constructed by interconnecting the panels, the individual panels are clearly discernible due to the exposed frames of adjacent panels. Thus the appearance of the partition is dictated by the material of the panels.

Attempts have been made to improve the appearance of the partitions by providing each panel with a frame there being provision from the attachments of individual surface elements, for convenience called tiles, which can be clipped to the frame, the arrangement being that the tiles overlie the frames so that when erected, the frames are not visible. However as the frames are constructed individually, the versatility is limited to the range of sizes of the frames.

Also as each work station requires the supply of electrical power, communication and computer cabling, provision is required to be made for the cabling to be carried within the panels or partitions.

An example of an office partition which provides for the addition of tiles to a framework and also for the provision of cabling to be located within the partition is shown in U.S. Pat. No. 5,219,406. However that panel is also limited to the dimensions of the vertical frames, while the length can be varied during construction of the panel, so that the constructed panel is then transported to the construction site. The cabling has to be manually threaded though the uprights supporting the panel.

DISCLOSURE OF THE INVENTION

It is an object of this invention to provide a partition which is adaptable to any sized and shaped area.

It is a further object of this invention to provide a partition or panel which is constructed and erected on site so as to conform directly to the dimensions of the area to be partitioned.

It is a further object of the invention to provide a partition or wall in which the tiles are not limited to a modular construction and which tiles can cover more than the horizontal spacing of the upright members.

It is a further object of the invention to provide a panel or partition in which the covering or surface tiles are clipped to the frame of the panel.

It is a still further object of the invention to provide a partition or panel in which the opposed surfaces of the panel or partition are spaced from each other in such a manner that cabling can easily be installed in the panel or partition.

A further object of the invention whereby the cabling can be installed before the panels are clipped in position, and thus any change or maintenance to the cabling can be easily made by unclipping the selected panels to expose the cabling.

Thus there is provided according to the invention a panel or partition comprising a plurality of spaced upright members, connecting blocks spaced vertically along the upright members, said connecting blocks having a lateral width greater than the width of the upright members, said connecting blocks each connecting a pair of parallel horizontally spaced horizontal members between adjacent upright members, and covering tiles attached by attachment means to adjacent vertically spaced horizontal members, whereby the tiles are spaced from the vertical members in which space cabling may be installed.

The invention therefore provides a partition including single vertical posts with cross rails for support of vertical and horizontal components.

Preferably the tiles can be of varying shape, colour and/or texture with adjacent tiles having complimentary shapes so that a desired visual effect can be produced.

BRIEF DESCRIPTION OF THE DRAWINGS

FIG. 6 illustrates an accessory used on the panel,

FIGS. 7(a) and 7(b) illustrate a further feature of the accessory,

BEST MODE FOR CARRYING OUT THE INVENTION

Figure 1:
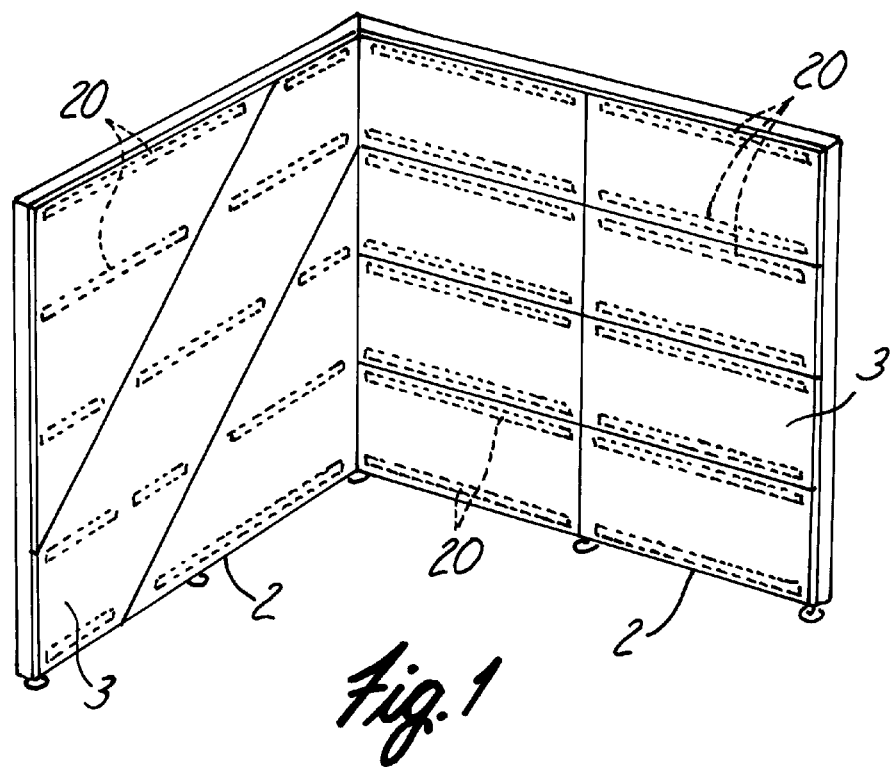
FIG. 1 illustrates one form of panel or partition according to the invention.
Figure 2:
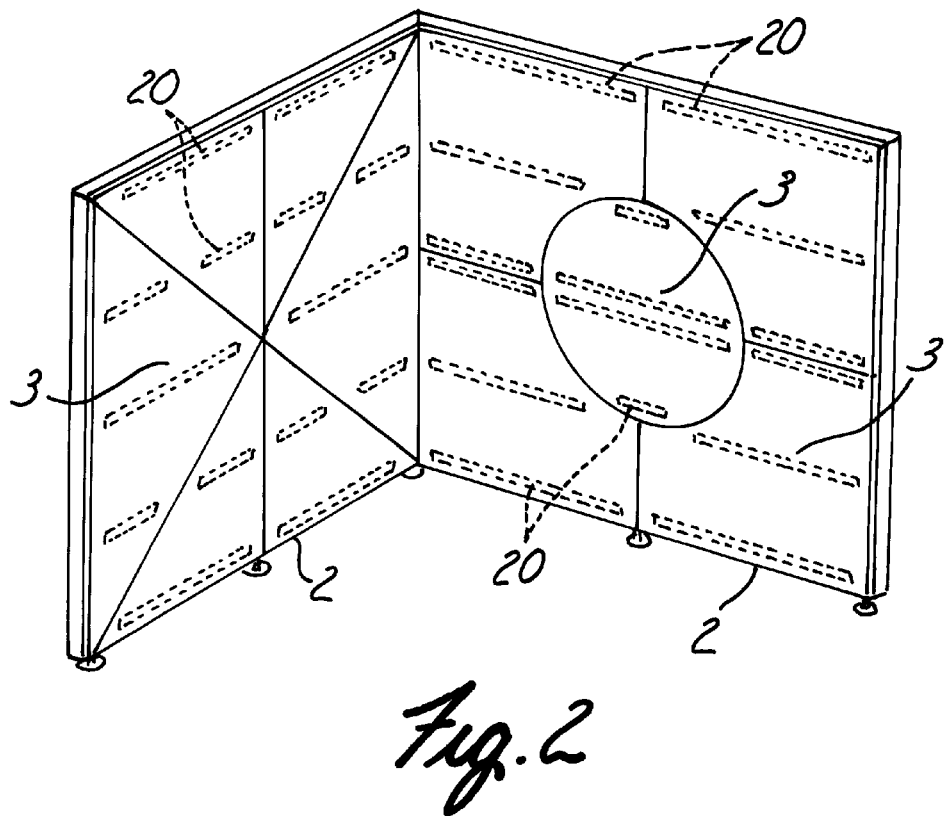
FIG. 2 illustrates a further form of panel.

Referring to the drawings, FIGS. 1 and 2 illustrate two partitions 1 comprising panels 2. Each panel 2 is composed of various tiles 3 of differing shapes which, as later described, are attached to a frame forming the structure of the partitions.

Figure 3:
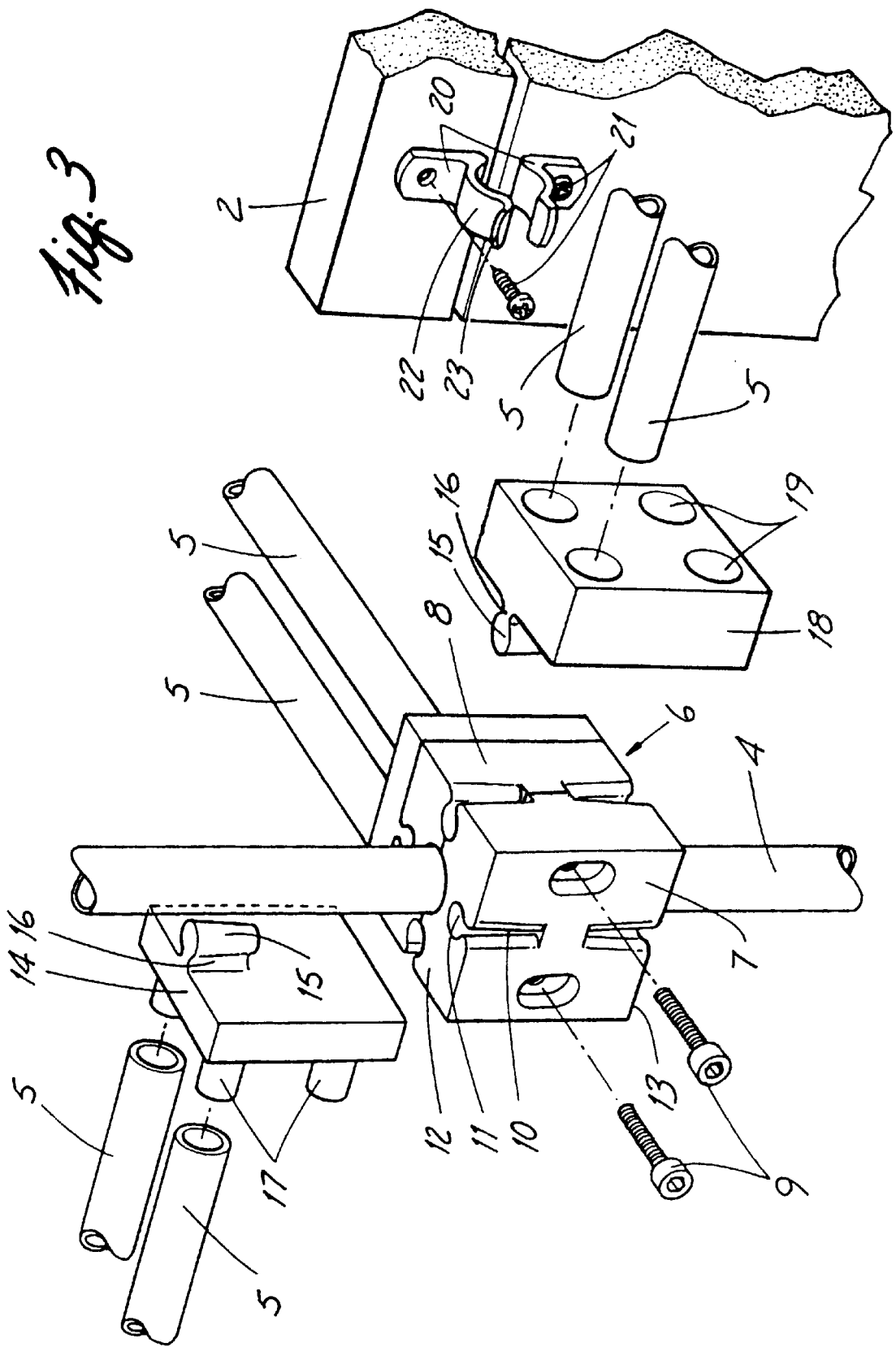
FIG. 3 shows in exploded form various forms of construction of the panel.

FIG. 3 illustrates in exploded view one embodiment of the invention. Each panel of the partition comprises a plurality of posts 4 connected by pairs of rails 5 to form the frame of the partition. A connecting block 6 comprising two portions 7 and 8 are positioned at the desired distance along the post 4 and clamped to the post 4 by studs 9, each portion 7 and 8 having a semicircular portion to embrace the post 4.

Also each portion has a pair of slots 10 extending from opposite faces 12 and 13 of the portion, the slots opening into tapered holes 11, the holes tapering from the respective faces 12 and 13. Also each portion has a corresponding half slot and half tapered hole on the face abutting the corresponding portion, so that these half slots and tapered holes form complete slot and tapered holes.

Two alternative methods of connecting the rails 5 to the connecting blocks are shown in FIG. 3. As show in the upper left portion of the Figure there is a cast chill 14 having a tapered plug 15 connected by a web 16 to the chill 14 on one face of the chill. On the opposite face of the chill, there are provided at least two and preferably four circular spigots 17 over which the hollow circular rails may be positioned.

On the right side of the drawing there is shown a chill 18 having on one face the tapered plug 15 and connecting web 16. However on the opposite side there are provided two, and preferably four holes 19 adapted to have the rails 5 inserted therein.

Also to the right of the Figure there is shown a portion of a tile 2 having a clip 20, fastened as by a screw 21 to the inner face of the tile 2 the clip having a recess 22 and a led in resilient portion 23 so as to be adapted to clip over a rail 5. It will be realised that the lower portion of the tile 2 will have a similar clip 20 but facing in the opposite direction with the clips facing each other so that the clip at the lower portion of the tile will clip underneath the respective rail 5 to thus secure the tile to the respective rails. Preferably there may be a plurality of clips spaced horizontally across each tile so that various shaped tiles can be clipped to the rails.

Alternately and most preferably, the clips on each tile are continuous across the tiles. Thus irrespective of the shape of the tiles, the tiles can be clipped to the rails and even extend over one or more upright posts.

In the erection of the panel or partition, the posts can be positioned the required distance apart, the blocks clamped at the required distances along the posts, the rails connected to a chill at each end of the rails and the rails and chill connected to the connecting blocks by positioning the tapered plugs within the tapered holes in the blocks.

Figure 4:
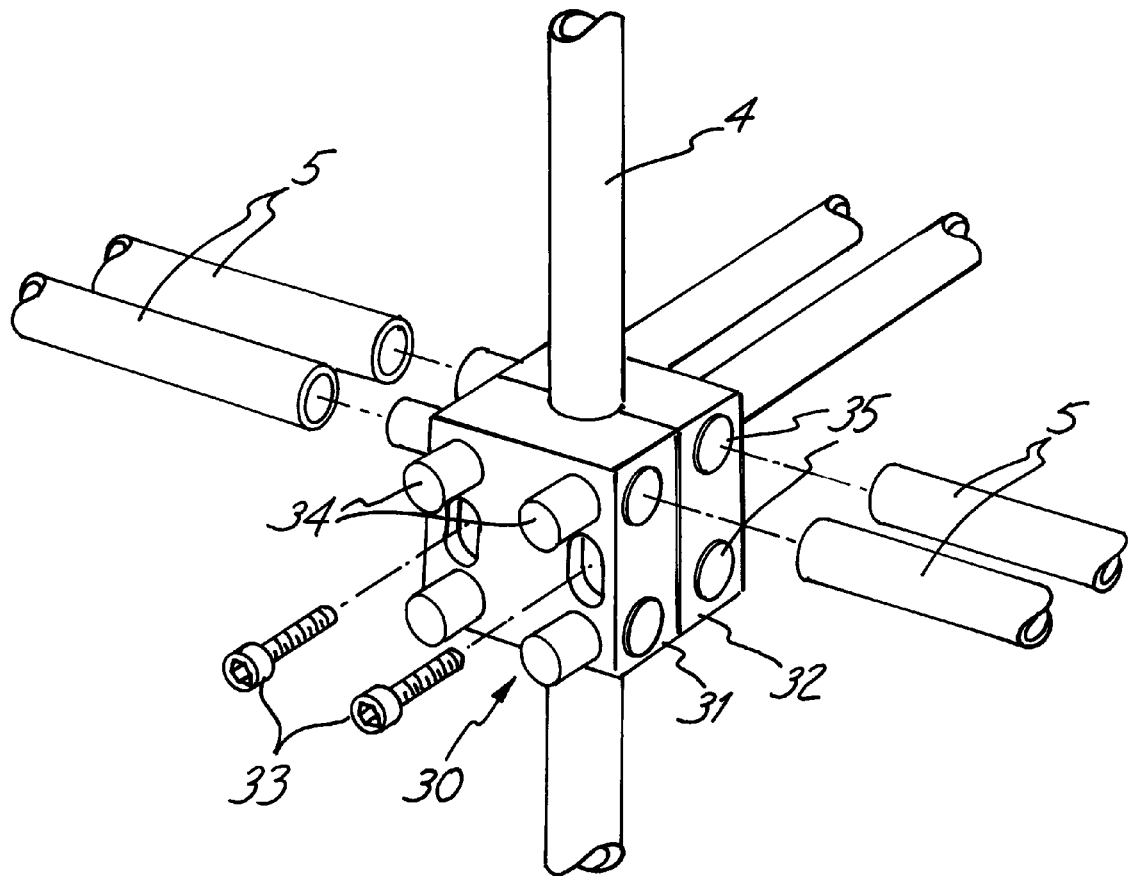
FIG. 4 illustrates a further form of construction.

FIG. 4 illustrates a further alternative of the invention. In this instance the connecting block 30 comprises two portions 31 and 32 adapted to be clamped to the post 4 by screws 33. This Figure also illustrates two different means for connecting to the rails 5. The portions themselves are provided either with spigots 34 or holes 35 which connect to the rails. In this embodiment the portions of the blocks have the holes or spigots, and thus the chills are not required in this embodiment.

However to erect a panel according to this embodiment, a post is positioned with the blocks thereon at the required spacing, a further post is prepared with the blocks at the required spacing ready for positioning, and the rails are then connected to the first positioned post, and then the second post is connected to the rails in the required position of the post.

Thus it can be seen that when the frame work is completed it is merely necessary to clip the tiles in position. As noted previously, the tiles can be rectangular, square, triangular, circular or any desired shape with adjacent tiles having complimentary shapes. Also the tiles need not be of the same colour, texture or manufactured of the same material, so that a variety of patterns, colours and finishes are available in any desired combination . The blocks can be spaced in the standard 400 mm spacing, or any other desired spacing. However if the partition is to be fitted to an existing area, the posts and rails can be cut to the desired length and easily assembled on site.

The lower ends of the posts will be provided with suitable pads or feet to rest on the floor. The panels or partitions are preferably erected on site, the blocks being clamped and positioned on the tubes, the posts positioned and the rails connected between the posts.

Figure 5:
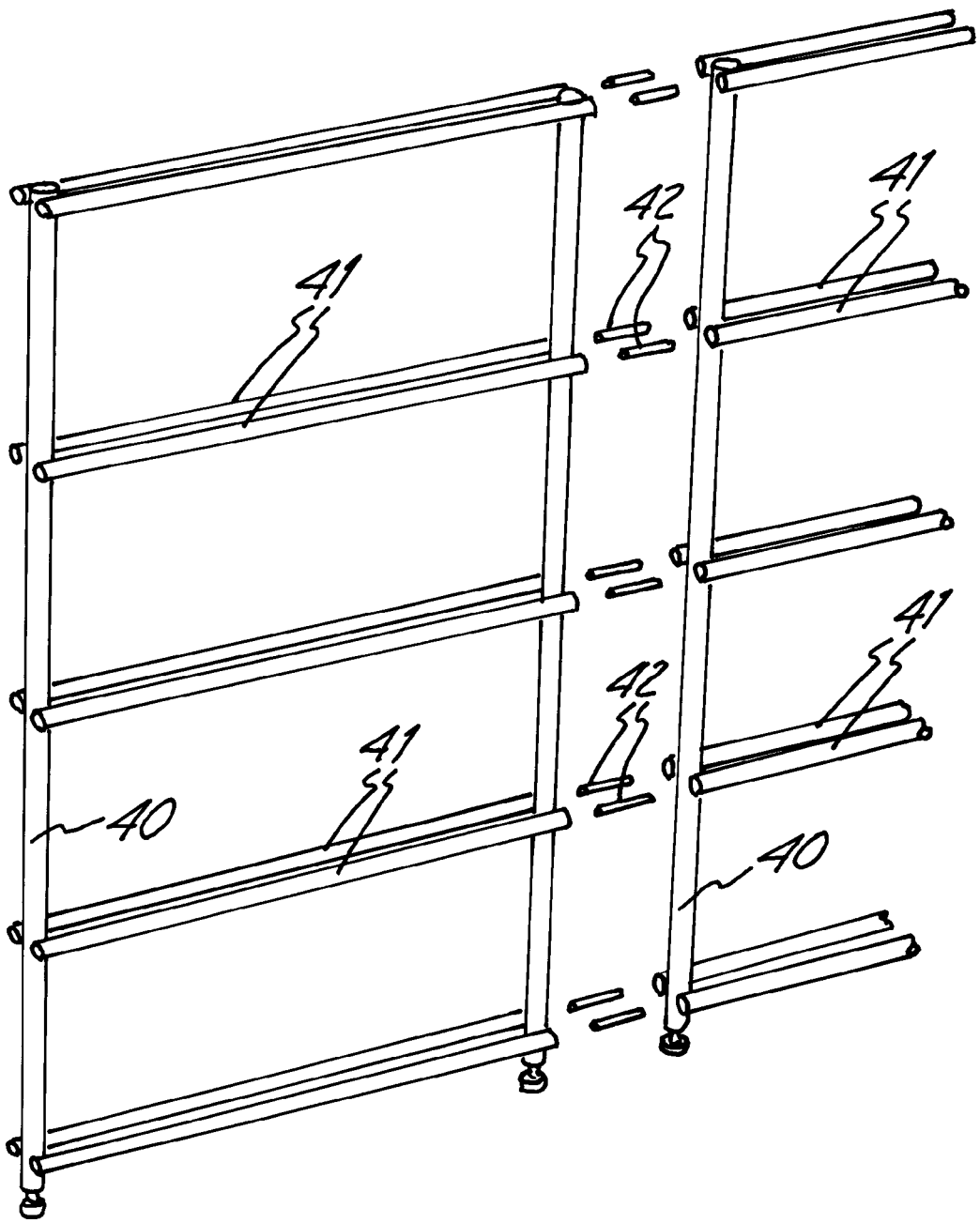
FIG. 5 shows a further form of the invention.

Also the invention can be applied to a frame work which manufactured in a factory and transported to the installation site. A further example is shown in FIG. 5 which frame includes posts 40 and hollow rails 41, the rails in this instance being welded, riveted or attached by screws or studs to the posts. If the frame is of welded construction, it would be desirable to construct the frame before taking to the erection site. The frames of various panels can be interconnected by connecting pegs 42 which are positioned in the ends of the hollow rails of adjacent frames.

To provide shelves, brackets can be clamped to the posts at the desired positions, the brackets extending between adjacent tiles.

Various brackets, shelves and the like can be attached to the frame of the panels and one such accessory is shown in FIG. 6. In the example the panel has posts 50, blocks 51 connected by the pairs of rails 52. A mounting tube or rail 53 is positioned between the blocks on one of the additional spigots or sockets in the respective blocks. Before positioning of the mounting rail 53, the mounting rail is passed through holes in the ends of mounting bars 54. The mounting bars 54 are of a length to extend to the next lower pair of rails 52, and have an arcuate recess at their lower end to fit and snap over the lower rail 52. Thus it is seen that the shelves, etc. are attached to the horizontal rails, and not necessarily to the posts.

The mounting bars can be interconnected by any desired covering or material or sheet member to which accessories may be attached or added. Thus in this example there is a metal panel 55 interconnecting the mounting bars, the panel 55 being screwed to the mounting bars. The panel has a plurality of spaced upwardly facing tongues 56 pressed out of the panel 55 to which accessories, or a decorative tile can be attached. Thus this can form a hinged lid for a hatch to provide an opening through the partition, there being a similar lid on the other side of the partition. Thus the metal panel can be between the posts as in FIG. 6, or extend over one or more posts as in FIG. 7b.

Figure 8:
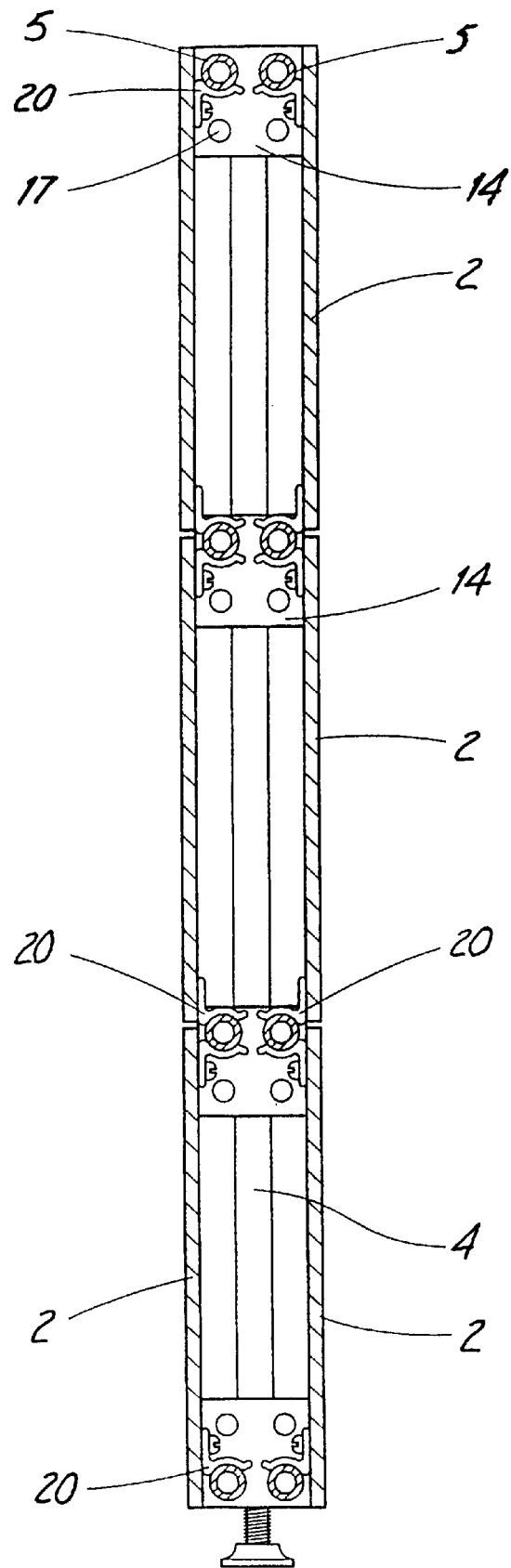
FIG. 8 is a cross sectional view of a panel attached to the rails.

An embodiment of the invention is shown in FIG. 8 which shows the panels 2 clipped to the rails 5 by clips 20. The rails 5 are supported by the blocks 6 on the posts 4 with the panels 2 spaced from the posts 4.

Figure 9A:
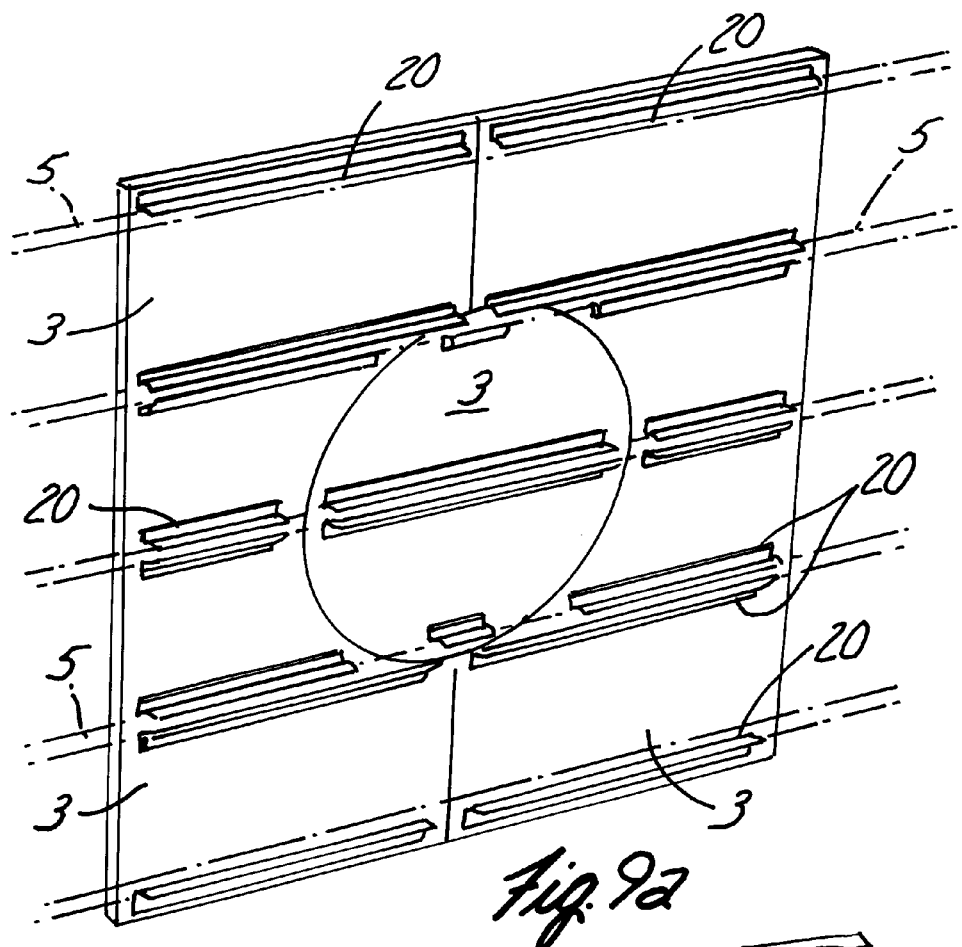
FIGS. 9(a) and 9(b) show a panel with continuous clips.
Figure 9B:
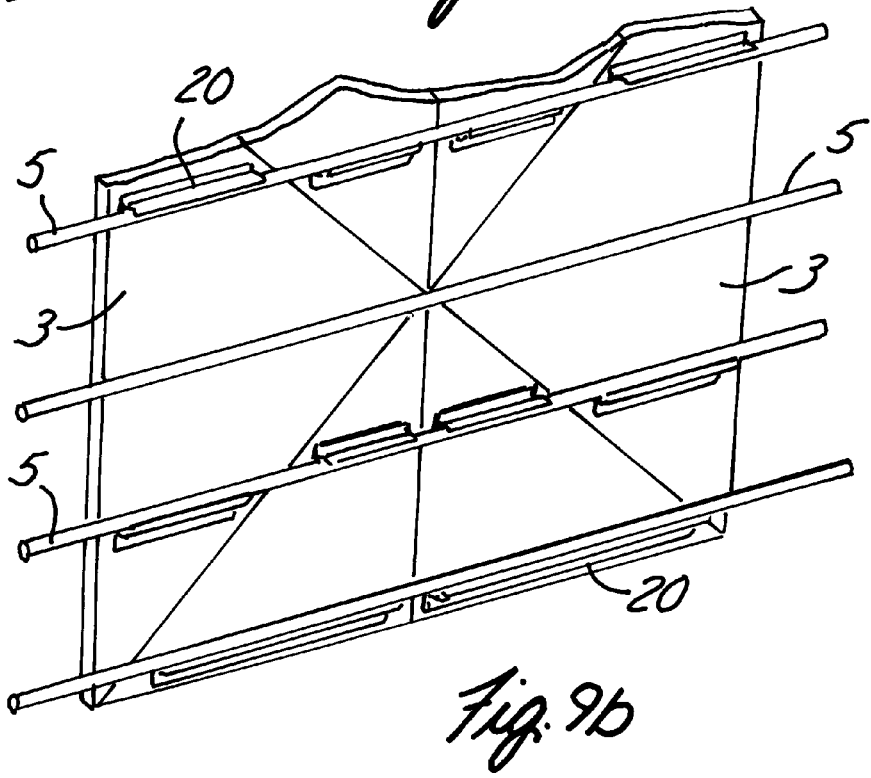

FIG. 9a illustrates an example of a panel made up of shaped sections 3 and the arrangement of clips thereon, thus producing a panel having a circular central portion, which can be of contrasting material and/or colour to the remainder of the panel. A further example is shown in FIG. 9b where the panel comprises a number of triangular sections 3 clipped to the rails 5. Various sections of the triangular sections 3 may be of varying texture and/or colour to produce an aesthetically pleasing appearance.

Thus with the present invention, the framework can be erected, and the cabling laid on the framework, passing beside the posts. The tiles can then be attached into position, selected tiles having openings for the cabling to pass there through or to have appropriate sockets or other connection units for the power, communications cables and computer cables. Preferably the cables are located by appropriate ties connected to the posts and or rails. When it is necessary to relocate or change any appliances or cabling it is merely necessary to unclip the appropriate tiles.

Also it is to be noted that any accessories need not be mounted on the post or upright members, but are able to be mounted on the rails. Thus the work top can be mounted on the horizontal rails. In this instance there can be provided four rails connected to the appropriate blocks or chills at the desired height, and the work top attached in cantilever fashion to these rails.

Thus it will be seen that the tiles are not limited to any modular construction. The posts can be positioned at any desired spacing. Even though the posts are spaced at a distance, the tiles can overlap the posts, and even one tile can be used for one partition covering from top to bottom and from end to end of the partition, covering all intermediate posts.

In a further alternative the clip means may be a continuous strip of hooks and loops.

The connecting blocks by being square allow for the partition panels to be placed at right angles when desired. However it is to be realised that some blocks can either have a triangular, hexagonal or octagonal shape so that the panels can extend at various angles depending upon the office requirements.

Cover pieces (not shown) are also provided to cover the top and ends of the panels or partition. These would be clipped in position on the top and the exposed ends of the partition where the panels do not abut each other or abut against a wall or the like.

This it will be seen that the panel or partition is easily erected on site, the tiles can be designed to have any desired aesthetic effect, and also provision is made for the cabling to be easily installed, changed or removed as desired.

Although various forms of the invention have been described in some detail it is to be realised that the invention is not to be limited thereto, but can include variations and modifications falling within the spirit and scope of the invention.

What is claimed is:

1. A panel or partition comprising a plurality of spaced upright members, connecting blocks spaced vertically along the upright members, each said connecting block comprising two halves clamped to each other about the upright members said connecting blocks having a lateral dimension greater than the width of the upright members, said connecting blocks each connecting a pair of parallel horizontally spaced horizontal members between adjacent upright members, and covering tiles attached by attachment means to adjacent, vertically spaced horizontal members, whereby the tiles are spaced from the vertical members.

2. A panel or partition as defined in claim 1 wherein each half has a plurality of attachment members in the form of spigots extending from the surface of the block, said horizontal members being hollow and connecting over the spigots.

3. A panel or partition as defined in claim 1 wherein each half has a plurality of holes in its surface, said holes being dimensioned that ends of respective horizontal members are inserted therein to be connected to the block.

4. A panel or partition as defined in claim 1 wherein the horizontal members are hollow and are attached to the blocks by spigots over which the hollow horizontal members are positioned or holes into which the ends of the horizontal members are inserted.

5. A panel or partition as defined in claim 1 wherein said attachment means are extended horizontally across the tiles.

6. A panel or partition as defined in claim 5 wherein said attachment means is a single continuous clip extending across said tile.

7. A panel or partition as defined in claim 5, wherein said attachment means is a plurality of clips spaced across said tile.

8. A panel or partition as defined in claim 1 and including a connecting element releasably attached to each block, said connecting element having means to connect to the horizontal members whereby the horizontal members and connecting elements are assembled and then attached to the respective blocks.

9. A panel or partition as defined in claim 8 wherein each connecting element has a wedge shaped member attached to the connecting element by a web, and said block has at least one tapered aperture connected to the surface of the block by a slot so that the connecting element is connected to the block.

10. A panel or partition as defined in claim 8, wherein each block has a plurality of tapered apertures and slots.

11. A panel or partition as defined in claim 8 wherein the horizontal members are hollow and each connecting element connects to the horizontal members by either spigots which are inserted into the ends of said hollow horizontal members or by holes in the connecting elements into which the ends of the horizontal members are inserted.

12. A panel or partition comprising a plurality of posts supporting a plurality of pairs of horizontally spaced rails, each of said pairs being vertically spaced from each other, and said rails supporting covering tiles removably attached to the rails, said rails being secured to the posts via blocks which are clamped to the posts, each block having a lateral dimension greater than the width of the respective post.

\* \* \* \* \*